United States Patent [19]

Foord et al.

[11] 4,272,368
[45] Jun. 9, 1981

[54] FLUID FILTER AND INDICATOR

[75] Inventors: Brian A. Foord; Donald C. Leutz, both of Sylvania, Ohio

[73] Assignee: Parker-Hannifin Corporation, Cleveland, Ohio

[21] Appl. No.: 72,382

[22] Filed: Sep. 4, 1979

[51] Int. Cl.³ .............................................. B01D 35/00
[52] U.S. Cl. ........................................ 210/90; 210/94; 210/106; 210/130; 210/133; 210/136; 210/172; 210/232
[58] Field of Search ................... 210/86, 87, 90, 106, 210/130, 136, 443, DIG. 14, 94, 133, 172, 232

[56] References Cited

U.S. PATENT DOCUMENTS

| 3,382,978 | 5/1968 | Rosaen | 210/190 |
|---|---|---|---|
| 3,474,906 | 10/1969 | Tennis | 210/130 |
| 3,486,622 | 12/1969 | Resean et al. | 210/90 |
| 3,653,512 | 4/1972 | Brown | 210/130 |
| 3,815,542 | 6/1974 | Cooper | 210/90 |
| 3,827,558 | 8/1974 | Firth | 210/90 |
| 3,970,104 | 7/1976 | Decker | 210/90 |
| 4,139,466 | 2/1979 | Rosaen | 210/90 |
| 4,177,145 | 12/1979 | Schumalter | 210/136 |

Primary Examiner—Theodore A. Granger
Attorney, Agent, or Firm—Joseph B. Balazs

[57] ABSTRACT

A versatile filter structure adaptable for use in differently ported configurations includes accommodation for variations of bypass and shutoff valving and for filter element replacement from either end or centrally of the structure. A head casting is secured to a tubular housing and either may be the mounting device for the filter. A funnel shaped diverter having an oblique edge is removably mounted in the head casting and provides separation between inlet and outlet portions of the filter structure by means of an eliptical O-ring seal at the edge which engages the interior of the head casting. The diverter provides a smooth transition for fluid flow to the interior of the filter, supports one end of the filter element in the tubular housing, optionally houses a shutoff valve operative automatically upon filter element removal, and further houses a bypass valve for safeguarding against filter element blockage. The remote end of the housing which also supports the filter element consists in the different configurations of a welded-closed or removable end assembly, with or without a port and shutoff valving. An indicator mounted on the head casting is in fluid communication with opposite sides of the O-ring seal to monitor inlet and outlet pressure differentials. Dual diaphragms actuate and isolate a sensing piston in the indicator and a dual spring arrangement biases the piston for normal operation and to provide an indication of lack of filter element in the housing.

32 Claims, 6 Drawing Figures

U.S. Patent  Jun. 9, 1981  Sheet 1 of 3  4,272,368
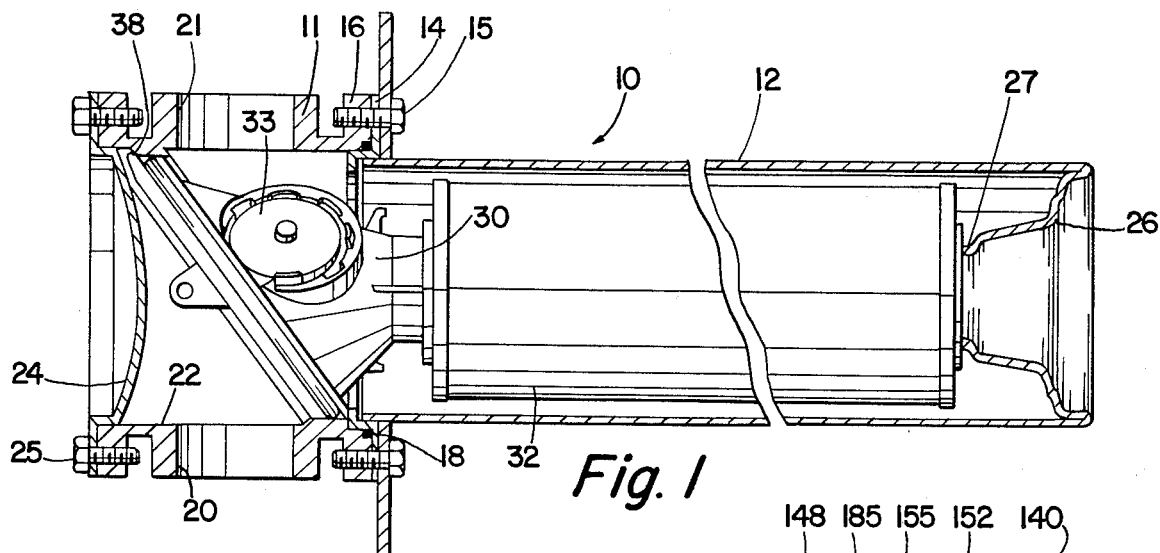
Fig. 1
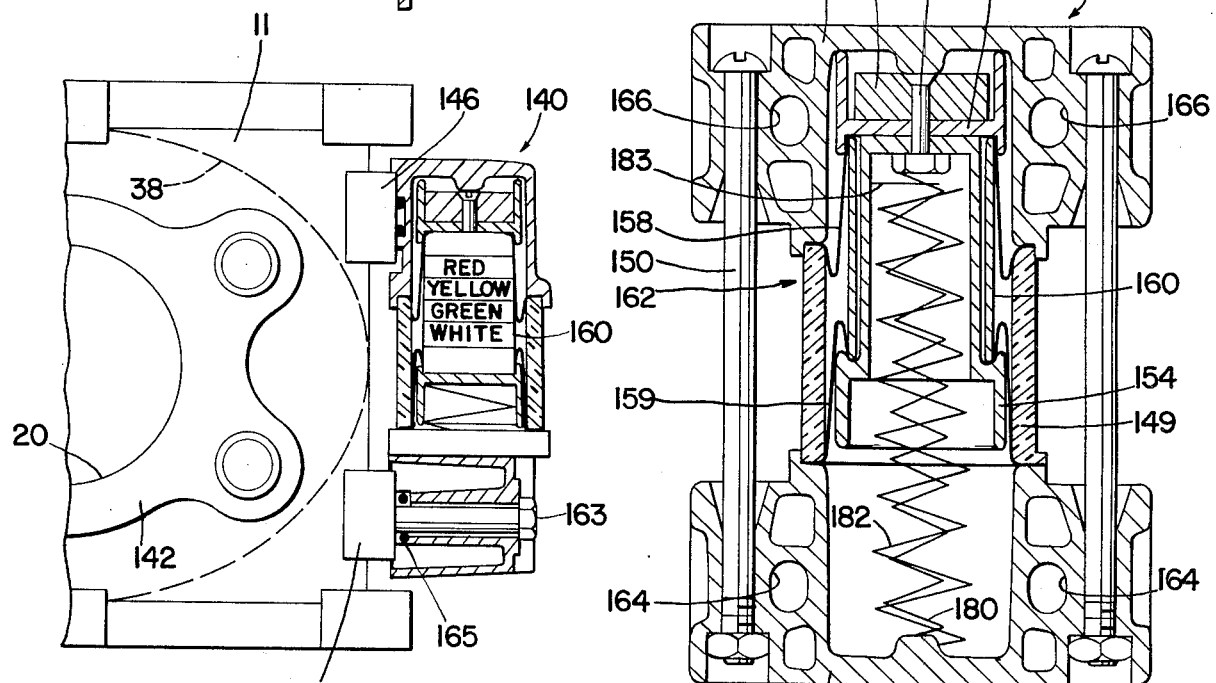
Fig. 4
Fig. 5
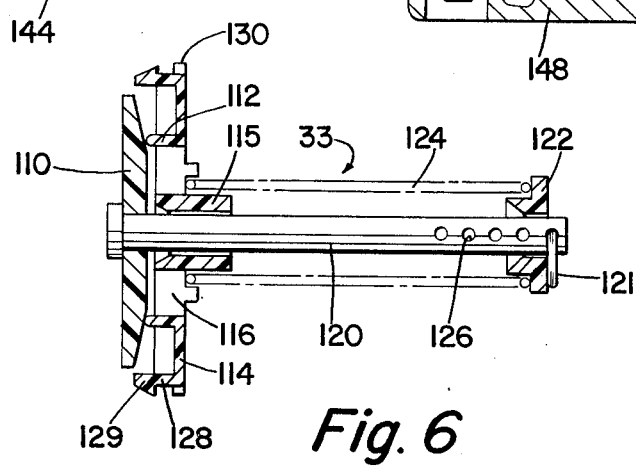
Fig. 6

FLUID FILTER AND INDICATOR

BACKGROUND OF THE INVENTION

This invention relates to fluid filters and more particularly to a hydraulic fluid filter having a differential pressure indicator.

Hydraulics filters of this type are commonly used as suction line filters, return line filters and pressure filters as well as in other configurations and it is conventional to employ specific designs of the filter housing for each of such applications.

In all these arrangements it is necessary from time to time to replace the filter element and it is often desired to accomplish such changeover without shutdown of the associated fluid system. Further, each filter design must be efficient in structure not only to achieve the results of adequate removal of particles of a particular size from the system but also to achieve sufficient dirt capacity in a convenient housing structure along with a favorable fluid flow versus pressure drop characteristic.

Still further in fluid filters of this type it is desirable to have means for monitoring the condition of the filter element to determine when the latter has become contaminated and requires replacement.

It would be desirable to have a common filter structure which is suitable for use in many of these different applications, wherein servicing of the filter element may be accommodated through either end of the filter housing or even from the central portion thereof and wherein the typical filter characteristics of quality of filtering are not sacrificed. Further it is desirable as well to provide means for indicating not only the condition of the filter element but also the presence or absence of same in the filter housing, with such indication provided either at the filter housing or at a remote location.

SUMMARY OF THE INVENTION

A versatile filter structure is provided in a two-piece housing consisting of a head casting and tubular filter container wherein the filter element can be reached for servicing through either end of the housing or alternately at the central portion thereof when the head casting and tubular housing are separated.

A unique diverter structure provides means for separating the head casting into inlet and outlet partitions in fluid communication respectively with the inner and outer portions of a tubular filter element. The diverter is in a truncated funnel shaped configuration mounted at its larger periphery within a cylindrical cavity in the head casting and slidable therethrough together with the filter element for replacement purposes. The diverter structure provides an efficient means for transmitting fluid flow between a transverse port of the housing and the axially aligned filter element, and enhances the fluid flow versus pressure drop characteristic of the filter. The smaller, necked down end of the funnel-shaped diverter serves to direct fluid flow to the interior of the filter element and further supports one end of the filter element within the housing. An optionally removable end closure at the distal end of the housing provides coaxial support for the filter element and, further, optionally includes access ports to the interior of the housing and may mount associated valving devices.

The eliptical mounting edge of the diverter separates the head casting into two chambers and this allows the convenience of mounting an indicator on the exterior of the head casting with fluid access to the chambers across the edge of the diverter element. A dual diaphragm arrangement supports a piston for slidable movement in the indicator housing to positions dictated by the fluid pressure differential to provide visual or remote indications of the filter characteristics. A compound spring arrangement is utilized to bias the piston and retains same at one end of the housing in the absence of any fluid differential to provide an indication of the absence of the filter element in the housing.

BRIEF DESCRIPTION OF THE DRAWINGS

FIG. 1 is a longitudinal sectional view of a preferred embodiment of the filter in an in-line ported arrangement.

FIG. 4 is a view of a portion of the head casting of the filter as viewed from the side of the inlet port showing the indicator device mounted thereon.

FIG. 5 is an enlarged sectional view of the indicator device.

FIG. 6 is a longitudinal sectional view of the snap-in type poppet valve used as the bypass and check valves in the filter embodiments.

DETAILED DESCRIPTION OF THE DRAWINGS

Figure 2:
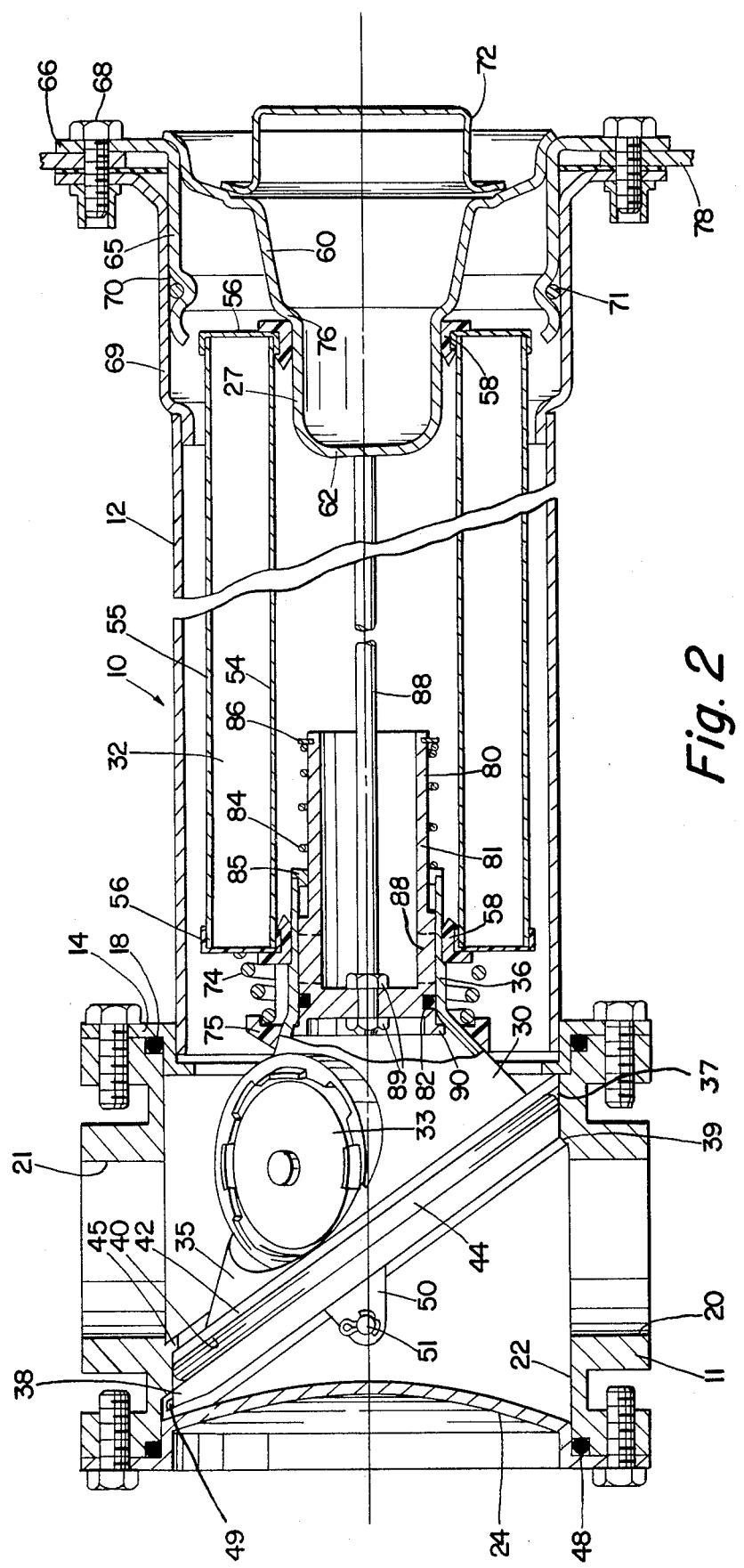
FIG. 2 is a similar longitudinal sectional view of another embodiment of the invention showing a filter with a removable end closure member.

Referring to FIG. 1 a first embodiment of the filter 10 comprises a generally tubular head casting 11 and a tubular filter housing 12, the latter having an annular flange piece 14 at one end welded to the housing 12. The flange 14 has arcuate slots therein (not shown) for receipt of mounting bolts 15 engaging threaded holes in a flange portion 16 of the head casting 11 to provide a quick-release fastening arrangement. An O-ring seal 18 between the flanges 14, 16 provides a fluid seal.

In this embodiment of the invention the head casting 11 includes an inlet port 20 and outlet port 21, generally in alignment with one another and both disposed substantially transverse to the longitudinal axis of the tubular housing 12. The head casting 11 comprises a generally cylindrical inner surface 22 extending therethrough, being closed at one end by inwardly-dished cover member 24 secured in place at its periphery by bolts 25 in a quick change slotted arrangement similar to that of the mounting flange of the filter housing 12 secured by bolts 15. The distal end of the filter housing 12 is fitted with a cup-shaped closure member 26, welded at its periphery to the end of the housing 12, the closure member 26 further including a central closed end tubular projection 27 which serves as a support member.

A diverter structure 30 is included in all embodiments of the invention supporting at one end a tubular filter element 32 and integrally therewith a bypass valve 33, which structures will be explained in further detail with reference to the enlarged showings of the different embodiments of the invention in FIGS. 2 and 3. In these representations the same reference numerals are employed for corresponding parts for ease of understanding.

Figure 3:
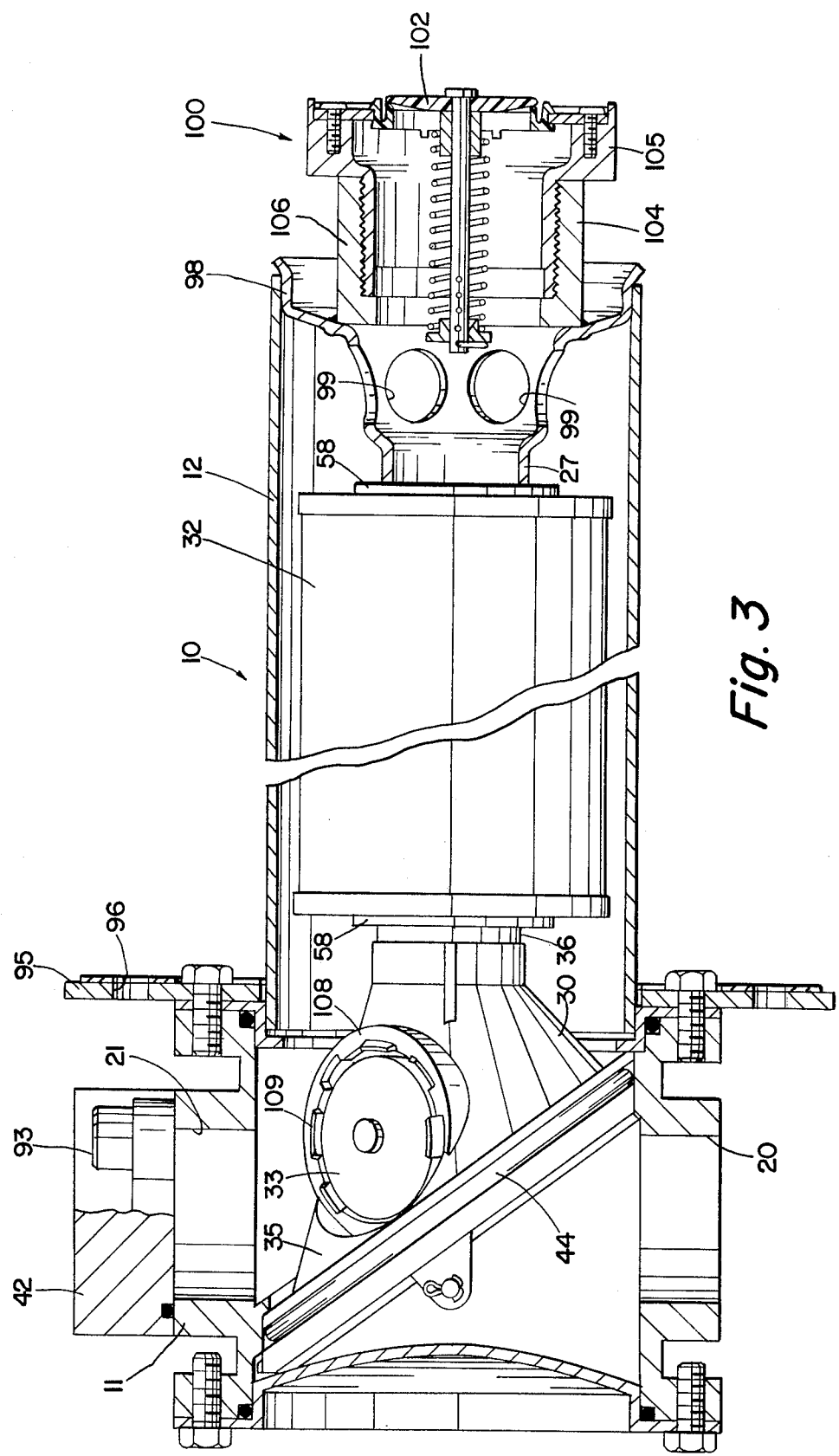
FIG. 3 is a further similar sectional view of a still further embodiment of the invention showing a filter housing ported for fluid flow through the remote end of the housing.

Referring now to FIG. 2 and a second embodiment of the invention the diverter structure 30 is shown in more detail as comprising a funnel-shaped structure having a hollow conical wall portion 35 joined to a generally tubular necked-down section 36 at the central portion thereof. The conical wall 35 of the funnel 30 is terminated at its outer end in a raised edge 38 which is oblique with respect to the longitudinal axis of the filter. The edge 38 is generally an oblique section of a cylinder conforming to the inner surface 22 of the head casting 11 and disposed along a plane angled with respect to the longitudinal axis of the filter 10. The edge 38 is substantially an annulus in the form of an elipse having the longer axis lying in the plane of the paper. A groove 40 is formed at the periphery of the edge 38 of the diverter 30, being bounded in part by the inward rim 42 which serves to secure an O-ring 34 in the groove 40.

The rim 42, forming a part of the edge 38 of the diverter 30 is seated against an internal ledge 45, the latter partially circling the inner surface 22 of the head casting 11 at an oblique angle, generally extending from just outside the outlet port 21 toward a location inside the inlet port 20. The inner surface 22 consists of a larger diameter portion providing clearance for the diverter 30 and a reduced diameter seating portion 37, joined by the bevel 39. The head casting 11 is a die cast aluminum part and requires no further finishing for the internal surfaces thereof, including the seal seating portion 37 and the lead-in bevel 39. The cover member 24 which is in sealed engagement with the head casting 11 by means of O-ring 48 may engage the outer portion of the edge 38 or be slightly spaced therefrom, as shown, to retain the diverter 30 in a seated position. A projection at 49 on edge 38 and a mating notch in inner surface 22, assure proper orientation between the diverter 30 and the head casting 11 so that the tubular portion 36 is concentric with the longitudinal axis of the housing 12. A pair of supports 50 provide a mounting device for transversely extending pin 51 which is used for gripping to assist in removing the diverter structure 30 from the head casting 11. The diverter 30, thus may be readily removed from or inserted in the head casting 11 by non-rotative axial movement, the bevel 39 providing an initial compression of the seal 34 upon insertion. Engagement of projection 49 in its mating notch and the geometry of the seating parts of the diverter edge 38 and ledge 45 provide the proper orientation for the installation.

The diverter 30, which is a molded plastic part, is preferably mounted in the head casting 11 with the operative axis of the bypass valve 33 oriented at an angle of 45 from the axis of the outlet port 21. In this location, an optimum length of opening is provided for the poppet of the bypass valve 33 so that it will not obstruct the outlet port 21 or engage the interior wall 22 of the head casting. This arrangement provides sufficient spacing from the interior wall 22 so that the mounting boss for the bypass valve 33 does not disrupt significantly, the smooth flow of fluid about the exterior of the conical wall 35 of the diverter. Further, such orientation provides a relatively direct flow of fluid to the outlet port 21 when the bypass valve is opened. Still further, such orientation minimizes any jet stream effect upon the poppet due to inpingement of fluid from the inlet port 20.

The filter element 32 consists of a cartridge type filter having a perforated tubular wall structure consisting of concentric inner and outer walls 54, 55 respectively, secured together at either end by means of end caps 56 and sealed at either end by annular rubber grommets 58. The filter element 32 thus is supported in the housing 12 on the tubular portion 36 of the diverter 30 at one end and at the other end on the tubular projection 27 of the enclosure 60 in coaxial alignment with the tubular housing 12.

In this embodiment of the invention end closure 60 comprises a cup-shaped member having a central tubular projection 27 with closed inner end 62. The closure member 60 in turn is releasably secured to the filter housing 12, being welded to intermediate tubular adapter member 65, the latter having a radially extending flange 66 secured by the mounting bolts 68. The adapter member 65 slidably fits within a tubular extension member 69 of the filter housing 12, the extension member 69 being of slightly greater diameter and welded in place to the filter housing. A groove 70 is formed in the adapter member 65 adjacent its inward end to retain O-ring seal 71 which provides fluid-tight engagement with the I.D. of the housing extension 69. The arrangement allows relative sliding movement between the housing extension 69 and the adapter member 65 while maintaining a fluid-tight seal. The flange 66 of the adapter member 65 includes slotted grooves therein forming a quick-connect coupling with the tubular extension 69 similar to that used at the housing flange 14 proximate to the head casting 11, as well as that for the cover member 24. Thus it may be seen that the end closure 60 may be rotated a slight amount to be freed from the loosened mounting bolts 68 and then withdrawn from the end of the tubular extension 69, maintaining fluid-tight engagement until the O-ring 71 separates from the extension 69, a handle 72 being provided to facilitate this movement.

A conical compression spring 74 is provided between projections 75 on the diverter 30, forming a spring retainer, and the inner end cap 56 of the filter element 32 thereby urging the filter element 32 into engagement with the closure member 60, being limited in movement by the shoulder 76 on the latter. Thus as the closure member 60 is withdrawn from the tubular housing 12 it will be seen that the spring 74 urges the filter element 32 outwardly such that the outer grommet 58 of the filter element 32 will maintain engagement with the shoulder 76 of the enclosure 60. The axial length of the tubular extension 69 is selected to be sufficiently long so that fluid-tight engagement between O-ring 71 and extension 69 is maintained until a position is reached wherein the inner grommet 58 clears the outer end of the tubular portion 36 of the diverter 30 to establish fluid communication between the interior of the housing 12 and the interior of the diverter 30.

In a typical application for such filter embodiment depicted in FIG. 2 housing 12 could be oriented in a vertical position within a fluid reservoir having a fluid level intermediate the end caps 56 of the filter element 32. In such arrangement the filter 10 is supported by bolts 68 in an aperture in the top wall 78 of the reservoir with fluid flow occuring between the inlet and outlet ports 20, 21. End closure 60 may be removed as described for replacement of filter element 32 and this will introduce air into the upper part of the reservoir, which if drawn into a pump connected to the fluid system could cause cavitation and possible damage. This is prevented by the automatic displacement of the filter element 32 from the tubular support 36 of the diverter 30 under the urging of spring 74, prior to breaking the fluid seal effected by O-ring 71. Thus it may be seen that fluid communication is achieved between the inlet and outlet ports 20, 21 by way of the central tubular portion 36 of the diverter 30 without the introduction of air into the fluid system. In this described arrangement the interior of tubular portion 36 is entirely free of any structure.

An alternative embodiment however, as fully depicted in FIG. 2, includes a check valve 80 disposed within the tubular portion 36 of the diverter 30. The valve 80 consists of a shutoff piston 81 carrying an O-ring seal 82 in a groove adjacent its inner end. The piston 81 is biased outwardly toward the distal end of the tubular housing 12 by means of spring 84 acting between spring retainer 85 and the retaining clip 86, the latter secured in a groove at the outer end of the piston 81. The check valve 80 is shown in the closed position in FIG. 2 however under normal operating conditions such check valve would be in an open position with fluid communication being provided via axial slots 87 through the wall of the piston 81, with the O-ring seal 82 being disposed inwardly within the hollow cone of the diverter element 30. An actuating device is provided for this purpose comprising rod 88 threaded at one end and secured to the piston by means of bolts 89 and engaging at the outer end the closed wall 62 of the tubular portion 27 of the closure member 60.

The length of the actuator rod 88 is adjusted so that when the end closure member 60 is in a fully inward position in the tubular extension 69 of the filter housing 12, check valve 80 will be in an open condition such that fluid can flow through the tubular portion 36 of the diverter 30. As the end closure 60 is withdrawn from the housing extension 69 shutoff piston 81 will follow the motion of the closure member through the intermediacy of the actuating rod 88 until the O-ring seal 82 enters the tubular portion 36 and creates a sealing engagement therewith. Further outward movement of the shutoff piston 81 is prevented by radially outwardly projecting flange 90 at the inner end thereof.

Fluid flow in all of the embodiments of the invention is from the center of the filter element 32 to the periphery thereof and in the embodiments depicted in FIGS. 1 and 2 is from the inlet port 20 through the diverter cone 35 and the tubular portion 36 thereof, then through the filter element 32 to the outlet port 21. In the embodiment of the invention depicted in FIG. 3 however outlet port 21 is closed by means of cap 92 secured by bolts 93 and the second port of the filter 10 is at the distal end of the filter housing 12. In FIG. 3 the filter 10 is mounted to an adaptor plate 95 in turn mounted to a wall of a fluid reservoir (not shown) by means of bolts passing through the apertures 96. In this return line type filter, head casting 11 is disposed outside the wall of the reservoir with the tubular housing 12 inserted therein into the fluid medium therein. The end closure or support 98 in this instance is a cup-shaped member having a similar central tubular extension 27 with a closed inner end wall (not shown) with circumferentially spaced apertures 99 in the side of the cup. Thus fluid flow is into the port 20 through the diverter 30 into the interior of the filter element 32 and out the periphery thereof into the annular space within the tubular housing 12 and through the apertures 99 outwardly of the filter housing 12.

In an alternative embodiment of the invention a check valve 100 is secured within the closure member 98. Such check valve 100 is a unidirectional flow pressure operated poppet type valve shown more clearly in enlarged form in FIG. 6. The poppet 102 thereon serves to close an aperture formed in the generally tubular adapter housing 104, the latter comprising a first annular section 105 threaded into a tubular support member 106 which in turn is welded in place within the cup of the end closure member 98. The check valve 100 comprises a snap-in type poppet assembly which can be readily interchanged to provide different pressure operating levels. Alternately, the check valve 100 could be arranged in an opposite disposition by means of a change of the housing section 105 to check flow of fluid in the reverse direction when the filter 10 is employed with the distal end of the filter housing 12 as the inlet port.

When the filter is arranged with the distal end of the housing 12 as the inlet port, either with or without a check or shutoff valve at that location, a cap is placed over the inlet port 20, and the outlet port 21 opened to act as the second port for the filter. The apertures 99 in the end member 98 are closed and a hole is located in the end wall of the tubular support member 27 so that the inlet is within the filter element 32. Thus, fluid flow, again, is into the interior of the fluid element 32 and through its periphery into the annular space inside the filter housing 12, and then through the outlet port 21. The exterior conical surface of the diverter element, efficiently directs flow of fluid to the outlet port 21, and it will be noted that bypass valve 33 serves, in its usual function, to maintain a maximum level of fluid pressure differential between inlet and outlet, regardless of the condition of the filter element 32.

In all the embodiments of the invention a bypass valve 33 is employed to provide a fluid path between the inlet and outlet ports of the housing to prevent against a contaminated condition of the filter element 32 wherein such blocked filter might disrupt fluid flow or create too high a pressure drop. The bypass valve 33 is similar to the shutoff valve 102 depicted in FIG. 3 comprising a snap-in type replaceable poppet valve assembly adapted for quick interchange upon removal of the diverter 32 from the head casting 11. The poppet valve 33 is depicted in cross-section in FIG. 6 and is adapted to be mounted in an aperture in a flat surface formed as a generally transversely extending boss 108 disposed in the conical side wall 35 of the fluid diverter 30. The flat surface of the boss 108 lies in a plane generally parallel with the longitudinal axis of the filter and includes circumferentially spaced notches 109 about the central opening therein forming a part of a quick-connect arrangement and adapted to mount the bypass valve 33 within the hollow cone of the diverter 30 in a generally transverse position.

Referring now to FIG. 6 it is seen that the valve 33 comprises a circular poppet 110 adapted to close upon a raised annular seat 112 in a generally circular poppet mount 114. The poppet is formed of nylon and the poppet mount 114 is preferably formed of glass filled nylon and the latter includes a central hub portion 115 supported by several radially extending legs 116, having spaces therebetween forming apertures for fluid flow through the mount 114. The hub 115 has a central bore for supporting a pin 120 therein, the latter having a head at one end for retaining the poppet 110 and a clip 121 at the either end securing a spring retainer 122 for guiding compression spring 124. The retaining clip 121 may be placed in different ones of cross holes 126 for varying the bias of the spring 124.

The outer periphery of the poppet mount 114 is formed as a plurality of upstanding legs 128 each having a catch 129 thereon which is adapted to pass through a notch 109 in the boss 108 on the diverter 30 until engagement occurs between a peripheral ridge 130 on the poppet support 114 and the lower surface of the boss 108. Partial rotation of the poppet assembly then will cause the catches 129 on the upstanding legs 128 to ride up on slight inclines on the outer face of the boss 108 until a slight depression is reached to secure the assembly in fluid-tight engagement within the boss 108.

Referring now to FIGS. 4 and 5 there is shown the indicator element 140 of the invention which provides a visual indication of the fluid pressure differential within the filter housing 11 and thus an indication of the condition of the filter element 32. FIG. 4 is a view toward the inlet port 20 of that embodiment of the invention shown in FIG. 1, the port 20 being a bore in the boss 142 protruding from the head casting 11. The position of the edge 38 of the diverter 30 is depicted in dashed lines in FIG. 4, the O-ring seal on such edge 38 dividing the interior of the head casting 11 into two portions isolated from one another and which communicate respectively with the inlet and outlet ports of the filter 10. Lateral bosses 144, 146 protrude from the head casting 11 each having a port therein communicating with the interior of the head casting 11 on opposite sides of the O-ring seal on the edge 38 of the diverter 30. Thus bosses 146 have bores therein in communication with the inlet port 20 while boss 144 has a bore therein in communication with outlet port 21.

The indicator 140 comprises a housing formed of identical end structures 148 securing a glass sleeve 149 therebetween by means of bolts 150. The sleeve 149 and recesses in the end caps 148 form a central cylindrical chamber in which is disposed a piston structure consisting of back-to-back upper and lower cup-shaped members 152, 154 respectively secured by bolt 155.

A pair of diaphragms are secured at one end between the sleeve 149 and the end members 148 and at the other end at opposite ends of an indicator sleeve 160 secured between shoulders of the upper and lower cup-shaped piston members 152, 154. The diaphragms 158, 159 are annular rolling diaphragms having a fold intermediate their respective ends and are positioned such that there is a short axial space between the adjacent folds indicated generally at the arrow 162. It will be seen that as the piston assembly 152, 154 moves upwardly and downwardly within the cylindrical chamber, the viewing space 162 will maintain approximately the same spacing between folds but will move upwardly and downwardly with the piston to expose different axial segments of the indicator sleeve 160. As seen in FIG. 4 the indicator sleeve 160 is colored with different bands to provide a visual indication of the different positions of the piston assembly therein.

The indicator housing 140 is mounted to the head casting 11 at the bosses 146, 144 by means of bolts 163, with sealing being effected by O-rings 165. Bores in the ports 146, 144 communicate with the indicator housing bores 166, 164 which in turn communicate respectively with the chambers formed above the upper diaphragm 158 and below the lower diaphragm 159. Thus, fluid pressure on either side of the diverter edge 38 is applied to the piston assembly 152, 154 to effect a differential force upon the piston assembly and a positioning of same in a manner well-understood in the art. A light compression spring 180 is mounted between a boss in the lower housing section 148 and the inside well of the lower piston portion 154, thereby continuously urging the piston assembly in an upward direction as viewed in FIG. 5. A second spring 182 having a higher spring rate than that of spring 180 is coaxially mounted therewith but terminates at the last coil 183 thereof out of contact with the lower piston portion 154 such that the spring 182 is not engaged until the piston assembly has moved to a position where indications are desired of the fluid pressure differential within the filter 10 housing. In this manner a different spring rate may be provided for fluid pressure differential indications while the light spring bias provided by spring 180 serves to retain the piston assembly fully in one position in the absence of any fluid pressure differential acting against the diaphragms 158, 159. A magnet 185 is further secured in the inner well of the upper piston element 152 and is adapted to create a magnetic field outside of the housing 148 for actuation of a reed switch or the like (not shown) to provide a remote indication of the piston assembly position and thus of the contaminated condition of the filter element 32, or even the lack of filter element in the filter.

As noted in FIG. 4 the indicator sleeve 160 is divided into several axially spaced segments of different colors ranging from white through green and yellow to red, wherein white gives an indication of absence of filter element, green the proper operating pressure differential, and yellow and red indicating higher pressure differentials, demonstrating a relatively clogged condition of the filter element 32, and indicating the need for replacement thereof.

What is claimed is:

1. A filter assembly, comprising a housing, a filter element supportive in said housing, a diverter supported in said housing for directing the flow of fluid therein, said diverter being removable from one end of said housing, thereby also to allow removal of said filter element through said one end of said housing, said diverter having support means thereon for supporting said filter element, said diverter comprising a funnel-shape structure having an oblique peripheral edge in supportive engagement with said housing, said oblique edge having a seal thereon to provide fluid tight engagement with said housing, and a bypass valve supported in said diverter for opening and closing a path of fluid communication through said diverter and from one side to the other of said seal on said diverter.

2. A filter assembly as set forth in claim 1 wherein said diverter structure comprises a central tubular portion for supporting said filter element thereon, said tubular portion being in sealing engagement with said filter element.

3. A filter assembly as set forth in claim 2 wherein said filter element is tubular and said housing is generally tubular, further including support means at the remote end of said housing for supporting the remote end of said filter element.

4. A filter assembly as set forth in claim 1 wherein said bypass valve means is supported in the wall of said diverter between said seal and said central tubular portion.

5. A filter assembly as set forth in claim 4 wherein said remote end support means is removable from said housing at the remote end thereof, thereby to allow removal of said filter element through said remote end.

6. A filter assembly as set forth in claim 5 further comprising check valve means supported in said diverter for preventing flow of fluid upon removal of said filter element, said check valve means being urged to an open condition when said filter element is supported in operative position in said housing.

7. A filter assembly as set forth in claim 6 wherein said check valve means is supported in the tubular portion of said diverter and includes an annular seal for operative sealing engagement therewith.

8. A filter assembly as set forth in claim 4 further including indicator means in fluid communication with the interior of said housing on opposite sides of said diverter seal means for monitoring the fluid pressure differential in said housing.

9. A filter assembly as set forth in claim 8 wherein said indicator means comprises a piston reciprocable in a housing, and dual diaphragms responsive to fluid pressure in said housing for actuating and isolating said piston.

10. A filter assembly as set forth in claim 9 wherein said indicator means further comprises sprng means for biasing said piston to a first position in the absence of a fluid pressure differential at said dual diaphragms, thereby to indicate the absence of a filter element in said housing.

11. A filter assembly as set forth in claim 4 further including check valve means at the remote end of said housing for controlling the flow of fluid through said remote end in one direction of fluid flow.

12. A fluid filter, comprising a generally tubular housing having inlet and outlet ports for routing fluid through said housing, one of said inlet and outlet ports being transversely disposed to the longitudinal axis of said housing and adjacent one end of said housing, a tubular filter element in said housing in fluid communication with said inlet and outlet ports, a diverter in said housing disposed between said transverse port and said filter element for routing the flow of fluid therebetween, said diverter being generally in the form of a funnel having a conical portion and a central tubular portion, said tubular portion being adapted to support one end of said filter element, a support member at the other end of said housing for support of the other end of said filter element in concentric relation to said housing, said conical portion of said diverter terminating in an edge lying generally in a plane angled with respect to the central axis of said housing, said edge being generally in the form of an ellipse, and a fluid seal at said edge in engagement with the interior of said housing.

13. A fluid filter as set forth in claim 12 further comprising a check valve mounted on said support member for controlling the flow of fluid at said other end of said filter element.

14. A fluid filter as set forth in claim 12 wherein said support member is releasably engaged with said housing for removal of said filter element through said other end of said housing.

15. A fluid filter as set forth in claim 14 wherein said support member is a closure member for sealing said other end of said housing.

16. A fluid filter as set forth in claim 15 further including a check valve for controlling the flow of fluid through said diverter, said check valve being biased to close said central tubular portion of said diverter, an actuating rod in engagement with said closure member said operable to urge said check valve to an open condition when said closure member is in a first fully closed position.

17. A fluid filter as set forth in claim 15 further including a bias spring disposed between said diverter and said filter element for urging the latter against said closure member, said closure member being adapted to maintain sealing engagement with said housing upon releasable movement outwardly from a first position where said filter element is in sealed fluid engagement with said diverter to a second position where said filter element is no longer in sealing engagement with said diverter.

18. A fluid filter as set forth in claim 17 further including a check valve disposed in said central tubular portion of said diverter for opening and closing same, a rod extending between said closure member and said check valve for urging the latter to an open position when said closure member is in said first position.

19. A fluid filter as set forth in claim 12 wherein said housing is a two part housing, a first part containng said diverter and a second part containing said filter element, said first and second parts being separably connected for replacement of said filter element through the proximate end of said second part housing.

20. A fluid filter as set forth in claim 19 wherein there is a quick release connection between said first and second housing parts comprising a slotted flange on one of said parts which cooperates with mounting bolts on the other part for release of said parts upon limited relative rotation therebetween.

21. A fluid filter as set forth in claim 12 wherein said seal is an O-ring seal.

22. A fluid filter as set forth in claim 12 wherein said housing includes an angled ledge therein for support of said edge of said diverter thereby to locate said central tubular portion concentrically with the longitudinal axis of said housing, said diverter being removably secured on said ledge.

23. A fluid filter as set forth in claim 22 wherein said housing comprises an opening at one end generally in alignment with the longitudinal axis of said housing, said opening being generally circular and adapted for removal of said diverter and said filter element therethrough.

24. A fluid filter as set forth in claim 23 further comprising a cover member releasably attached to said housing for sealing said opening and in engagement with said diverter for retaining said diverter on said ledge.

25. A fluid filter as set forth in claim 12 further including a pressure-operated bypass valve disposed in said conical portion of said diverter for establishing a path for fluid flow through said conical portion upon a predetermined level of fluid pressure in said diverter.

26. A fluid filter as set forth in claim 25 wherein said diverter includes a boss on said conical portion, extending generally transversely of the longitudinal axis of said housing, said bypass valve being supported in an aperture in said boss in a general transverse disposition.

27. A fluid filter as set forth in claim 26 further including a quick connect interconnection between said boss and said bypass valve for rapid interchange of said bypass valve.

28. A fluid filter as set forth in claim 26 wherein said bypass valve comprises adjustment means for altering the predetermined fluid pressure level of response thereof.

29. A fluid filter as set forth in claim 26 further including a check valve in said tubular portion of said diverter for controlling flow of fluid therethrough, said check valve beng closed by fluid pressure in said diverter and being maintained in an open position by mechanical engagement with an end closure of said housing.

30. A fluid filter as set forth in claim 26 wherein both inlet and outlet ports are transversely disposed in said housing and said diverter is disposed between said ports, said conical portion providing fluid isolation and said tubular portion providing fluid communication therebetween.

31. A fluid filter as set forth in claim 12 further comprising a differential pressure indicator mounted on said housing in fluid communication with the interior of said housing, said indicator being disposed across one peripheral edge of said conical portion for access to fluid pressure at both sides of said diverter.

32. A fluid filter as set forth in claim 31 wherein said indicator comprises dual diaphragms in engagement with a movable piston member which provides a visual indication, each diaphragm being exposed to fluid pressure on one side of said conical portion.

* * * * *